(12) United States Patent
Wallace et al.

(10) Patent No.: US 8,929,528 B2
(45) Date of Patent: Jan. 6, 2015

(54) METHOD AND SYSTEM FOR ENHANCING COLLABORATION

(75) Inventors: Raymond Wallace, Ashton (CA); Thomas Chmara, Richmond (CA); Alan F. Graves, Kanata (CA); Maja Jelaca, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 2207 days.

(21) Appl. No.: 11/303,989

(22) Filed: Dec. 19, 2005

(65) Prior Publication Data

US 2007/0004389 A1  Jan. 4, 2007

Related U.S. Application Data

(60) Provisional application No. 60/651,623, filed on Feb. 11, 2005.

(51) Int. Cl.
*H04M 3/42* (2006.01)
*H04L 12/16* (2006.01)
*H04Q 11/00* (2006.01)
*G06Q 10/06* (2012.01)
*G06Q 10/10* (2012.01)
*H04L 12/18* (2006.01)
*H04M 3/56* (2006.01)
*H04L 29/06* (2006.01)
*H04L 29/08* (2006.01)

(52) U.S. Cl.
CPC .............. *G06Q 10/06* (2013.01); *G06Q 10/10* (2013.01); *H04L 12/1818* (2013.01); *H04M 3/42374* (2013.01); *H04M 3/567* (2013.01); *H04L 65/403* (2013.01); *H04L 67/24* (2013.01); *H04L 67/18* (2013.01); *H04M 3/563* (2013.01); *H04L 65/1016* (2013.01)
USPC ...................... 379/202.01; 370/260; 370/261

(58) Field of Classification Search
USPC ................... 379/202.01–204.1; 370/260, 261
See application file for complete search history.

(56) References Cited

U.S. PATENT DOCUMENTS

| 4,601,064 A | 7/1986 | Shipley |
| 5,291,399 A | 3/1994 | Chaco |

(Continued)

FOREIGN PATENT DOCUMENTS

| CA | 2263428 | 2/1998 |
| CA | 2362635 | 8/2000 |

(Continued)

OTHER PUBLICATIONS

Jonathan Collins, RFID Remedy for Medical Errors, RFID Journal, http://www.rfidjournal.com/article/view/961, May 28, 2004, 3 pages.

(Continued)

*Primary Examiner* — Nafiz E Hoque
(74) *Attorney, Agent, or Firm* — Withrow & Terranova, PLLC

(57) ABSTRACT

In order to enhance collaborations, the system responds to a trigger event to determine the nature of any collaboration which should be assembled in response to the trigger, and determines the requirements needed to respond to the event. These requirements set out the type of resources (personnel, equipment, information systems, etc) that are needed. The system then identifies a subset of specific resources based on a criteria, and invites the specified resources to collaborate to respond to the event. The criteria can include the availability of the specific resource. According to an embodiment, the system evaluates responses from the invited resources and then convenes the collaboration, for example by establishing one or more communication sessions. According to an embodiment, the system evaluates responses from the invited resources to ensure that the requirements are satisfied, and if not, determines other resources to invite.

9 Claims, 3 Drawing Sheets

(56) References Cited

U.S. PATENT DOCUMENTS

| | | |
|---|---|---|
| 5,434,775 A | 7/1995 | Sims et al. |
| 5,465,082 A | 11/1995 | Chaco |
| 5,534,851 A | 7/1996 | Russek |
| 5,544,661 A | 8/1996 | Davis et al. |
| 5,594,786 A | 1/1997 | Chaco et al. |
| 5,610,596 A | 3/1997 | Petitclerc |
| 5,689,229 A | 11/1997 | Chaco et al. |
| 5,781,731 A * | 7/1998 | Koreeda et al. ............... 709/204 |
| 5,822,544 A | 10/1998 | Chaco et al. |
| 5,877,675 A | 3/1999 | Rebstock et al. |
| 5,901,172 A | 5/1999 | Fontana et al. |
| 5,910,776 A | 6/1999 | Black |
| 5,911,687 A | 6/1999 | Sato et al. |
| 5,942,986 A | 8/1999 | Shabot et al. |
| 5,952,641 A | 9/1999 | Korshun |
| 6,009,333 A | 12/1999 | Chaco |
| 6,026,125 A | 2/2000 | Larrick, Jr. et al. |
| 6,054,950 A | 4/2000 | Fontana |
| 6,211,790 B1 | 4/2001 | Radomsky et al. |
| 6,239,741 B1 | 5/2001 | Fontana et al. |
| 6,259,355 B1 | 7/2001 | Chaco et al. |
| 6,262,662 B1 | 7/2001 | Back et al. |
| 6,302,844 B1 | 10/2001 | Walker et al. |
| RE37,531 E | 1/2002 | Chaco et al. |
| 6,344,794 B1 | 2/2002 | Ulrich et al. |
| 6,462,656 B2 | 10/2002 | Ulrich et al. |
| 6,539,393 B1 | 3/2003 | Kabala |
| 6,577,238 B1 | 6/2003 | Whitesmith et al. |
| 6,662,068 B1 | 12/2003 | Ghaffari |
| 6,690,741 B1 | 2/2004 | Larrick, Jr. et al. |
| 6,753,671 B1 | 6/2004 | Harvey |
| 6,773,396 B2 | 8/2004 | Flach et al. |
| 6,812,884 B2 | 11/2004 | Richley et al. |
| 6,823,199 B2 | 11/2004 | Gough |
| 6,825,763 B2 | 11/2004 | Ulrich et al. |
| 6,870,916 B2 | 3/2005 | Henrikson et al. |
| 6,876,303 B2 | 4/2005 | Reeder et al. |
| 6,958,677 B1 | 10/2005 | Carter |
| 6,958,706 B2 | 10/2005 | Chaco et al. |
| 6,972,683 B2 | 12/2005 | Lestienne et al. |
| 7,042,337 B2 | 5/2006 | Borders et al. |
| 7,080,061 B2 | 7/2006 | Kabala |
| 7,154,397 B2 | 12/2006 | Zerhusen et al. |
| 7,242,306 B2 | 7/2007 | Wildman et al. |
| 7,283,037 B2 | 10/2007 | Diorio et al. |
| 7,289,227 B2 | 10/2007 | Smetak et al. |
| 7,336,171 B2 | 2/2008 | Kishimoto et al. |
| 7,343,312 B2 * | 3/2008 | Capek et al. ............... 705/7.19 |
| 2001/0044731 A1 | 11/2001 | Coffman et al. |
| 2002/0044043 A1 | 4/2002 | Chaco et al. |
| 2002/0044059 A1 | 4/2002 | Reeder et al. |
| 2002/0069030 A1 | 6/2002 | Xydis |
| 2002/0147912 A1 | 10/2002 | Shmueli et al. |
| 2002/0165731 A1 | 11/2002 | Dempsey |
| 2002/0183078 A1 | 12/2002 | Hase |
| 2002/0183979 A1 | 12/2002 | Wildman |
| 2003/0055899 A1* | 3/2003 | Burger et al. ............... 370/260 |
| 2003/0078810 A1 | 4/2003 | Cole et al. |
| 2003/0078811 A1 | 4/2003 | Cole et al. |
| 2003/0132845 A1 | 7/2003 | McDaniel, III |
| 2004/0001446 A1 | 1/2004 | Bhatia et al. |
| 2004/0004460 A1 | 1/2004 | Fitch et al. |
| 2004/0008114 A1 | 1/2004 | Sawyer |
| 2004/0034284 A1 | 2/2004 | Aversano et al. |
| 2004/0064355 A1* | 4/2004 | Dorenbosch et al. ............ 705/9 |
| 2004/0078151 A1 | 4/2004 | Aljadeff et al. |
| 2004/0078219 A1 | 4/2004 | Kaylor et al. |
| 2004/0100376 A1 | 5/2004 | Lye et al. |
| 2004/0100377 A1 | 5/2004 | Brackett et al. |
| 2004/0108954 A1 | 6/2004 | Richley et al. |
| 2004/0125938 A1 | 7/2004 | Turcan et al. |
| 2004/0125940 A1 | 7/2004 | Turcan et al. |
| 2004/0145477 A1 | 7/2004 | Easter et al. |
| 2004/0153344 A1 | 8/2004 | Bui et al. |
| 2004/0178947 A1 | 9/2004 | Richley et al. |
| 2004/0186357 A1 | 9/2004 | Soderberg et al. |
| 2004/0193449 A1 | 9/2004 | Wildman et al. |
| 2004/0203930 A1 | 10/2004 | Farchmin et al. |
| 2004/0252015 A1 | 12/2004 | Galperin et al. |
| 2004/0257224 A1 | 12/2004 | Sajkowsky |
| 2005/0017864 A1 | 1/2005 | Tsoukalis |
| 2005/0027465 A1 | 2/2005 | Pozsgay et al. |
| 2005/0035862 A1 | 2/2005 | Wildman et al. |
| 2005/0105734 A1 | 5/2005 | Buer et al. |
| 2005/0128083 A1 | 6/2005 | Puzio et al. |
| 2005/0148831 A1 | 7/2005 | Shibata et al. |
| 2005/0151641 A1 | 7/2005 | Ulrich et al. |
| 2005/0153681 A1 | 7/2005 | Hanson |
| 2005/0168341 A1 | 8/2005 | Reeder et al. |
| 2005/0188095 A1 | 8/2005 | Gardiner et al. |
| 2005/0201345 A1 | 9/2005 | Williamson |
| 2005/0283382 A1 | 12/2005 | Donoghue et al. |
| 2006/0006999 A1 | 1/2006 | Walczyk et al. |
| 2006/0045030 A1* | 3/2006 | Bieselin ................... 370/260 |
| 2006/0067250 A1* | 3/2006 | Boyer et al. ............... 370/260 |
| 2006/0127870 A1* | 6/2006 | Fields et al. ............... 434/350 |
| 2006/0143043 A1 | 6/2006 | McCallie, Jr. et al. |
| 2006/0158329 A1 | 7/2006 | Burkley et al. |
| 2006/0282459 A1 | 12/2006 | Kabala |

FOREIGN PATENT DOCUMENTS

| | | |
|---|---|---|
| CA | 2373241 | 11/2000 |
| CA | 2434714 | 8/2002 |
| EP | 0 369 662 A2 | 5/1990 |
| EP | 0 973 316 A2 | 1/2000 |
| EP | 1 101 437 A1 | 5/2001 |
| EP | 1 156 336 A1 | 11/2001 |
| EP | 1 536 306 A1 | 6/2005 |
| GB | 2320397 A | 6/1998 |
| GB | 2355889 A | 5/2001 |
| GB | 0602885.6 | 6/2006 |
| GB | 0602887.2 | 6/2006 |
| GB | 0602901.1 | 6/2006 |
| GB | 0602903.7 | 6/2006 |
| GB | 0602904.5 | 6/2006 |
| GB | 0602906.0 | 6/2006 |
| GB | 0602907.8 | 6/2006 |
| JP | 2002157040 A | 5/2002 |
| JP | 2003189359 A | 7/2003 |
| WO | WO 95/01617 | 1/1995 |
| WO | 9739553 | 10/1997 |
| WO | WO 99/04685 | 2/1999 |
| WO | 9949378 | 9/1999 |
| WO | WO 99/64974 A1 | 12/1999 |
| WO | WO 00/52498 | 9/2000 |
| WO | WO 2004/032019 A2 | 4/2004 |
| WO | WO 2004/042563 A2 | 5/2004 |
| WO | WO 2004/102457 A2 | 11/2004 |
| WO | WO 2005/043402 A1 | 5/2005 |
| WO | PCT/CA2006/000195 | 5/2006 |
| WO | PCT/CA2006/000196 | 5/2006 |
| WO | PCT/CA2006/000197 | 5/2006 |
| WO | PCT/CA2006/000205 | 5/2006 |
| WO | WO 2006/049728 A1 | 5/2006 |
| WO | PCT/CA2006/000198 | 6/2006 |
| WO | PCT/CA2006/000203 | 6/2006 |
| WO | PCT/CA2006/000204 | 6/2006 |
| WO | PCT/CA2006/001479 | 12/2006 |

OTHER PUBLICATIONS

Claire Swedberg, Ford Deploys RFID-Enabled Chargers, RFID Journal, http://www.rfidjournal.com/article/articleview/1348/1/1/, Jan. 19, 2005, 3 pages.

Parco Merged Media Corporation, "The Parco Real Time Location System", http://www.parcomergedmedia.com/whcs_pgis.html, downloaded Feb. 2005, 5 pages.

Parco Merged Media Corporation, "Improving the Availability of Information", www.parcowireless.com, downloaded Jan. 2005, 8 pages.

Parco Merged Media Corporation, "The Parco Wireless Health Care System (WHCS)", www.parcowireless.com, downloaded Aug. 2004, 8 pages.

(56) References Cited

OTHER PUBLICATIONS

Robert J. Fontana, Ph.D., "Experimental results from an ultra wideband precision geolocation system", www.multispectral.com, downloaded Aug. 2004, 9 pages.

Robert J. Fontana et al., "Ultra-wideband precision asset location system", www.multispectral.com, downloaded Aug. 2004, 5 pages.

Robert J. Fontana et al., "Commercialization of an ultra wideband precision asset location system", www.multispectral.com, downloaded Aug. 2004, 5 pages.

Dr. Zeev Weissman, "Indoor Location", Tadlys Ltd., www.tadlys.com, downloaded Jul. 2004, 15 pages.

Dongquan, Chen et al., "Wireless local area network in a prehospital environment", BMC Medical Informatics and Decision Making, vol. 4, Aug. 31, 2004, 9 pages.

Office Action mailed on Dec. 4, 2008 in connection with U.S. Appl. No. 11/064,930.

Office Action mailed on Mar. 6, 2009 in connection with U.S. Appl. No. 11/065,396.

Office Action mailed on Mar. 19, 2009 in connection with U.S. Appl. No. 11/065,099.

Office Action mailed on Apr. 1, 2009 in connection with U.S. Appl. No. 11/065,420.

Office Action mailed on May 16, 2008 in connection with U.S. Appl. No. 11/065,396.

Office Action mailed on Jun. 11, 2009 in connection with U.S. Appl. No. 11/064,930.

Office Action mailed on Jun. 12, 2009 in connection with UK Patent Application 0602901.1.

Office Action mailed on Aug. 19, 2008 in connection with U.S. Appl. No. 11/065,047.

Office Action mailed on Oct. 2, 2008 in connection with U.S. Appl. No. 11/065,046.

Chronaki et al., "WebOnCOLL: Medical Collaboration in Regional Healthcare Networks", IEEE Transactions on Information Technology in Biomedicine, vol. 1, No. 4, Dec. 1997, pp. 257-269.

Rodriquez et al., "Location-Aware Access to Hospital Information and Services", IEEE Transactions on Information Technology in Biomedicine, vol. 8, No. 4, Dec. 2004, pp. 448-455.

"IMS—IP Multimedia Subsystem—The value of using the IMS architecture", *a white paper from Ericcson*, Oct. 2004, pp. 1-24.

Office Action mailed on Nov. 16, 2009 in connection with U.S. Appl. No. 11/064,930.

Office Action mailed on Sep. 2, 2009 in connection with U.S. Appl. No. 11/065,071.

\* cited by examiner

METHOD AND SYSTEM FOR ENHANCING COLLABORATION

CROSS REFERENCE TO RELATED APPLICATIONS

The present application claims the benefit of a U.S. Provisional Patent Application to Graves et al. entitled "USE OF LOCATION AWARENESS TO ENHANCE COMMUNICATIONS FUNCTIONS IN A HEALTHCARE ENVIRONMENT", Ser. No. 60/651,623, filed on Feb. 11, 2005, and further claims the benefit of U.S. patent application to Graves et al. entitled "USE OF LOCATION AWARENESS TO ESTABLISH COMMUNICATIONS WITH A TARGET CLINICIAN IN A HEALTHCARE ENVIRONMENT, Ser. No. 11/064,930, filed Feb. 25, 2005. which are both hereby incorporated by reference herein.

FIELD OF THE INVENTION

The present invention relates generally to communication systems. More particularly, the present invention relates to communication systems with enhanced features which assist collaborations.

BACKGROUND OF THE INVENTION

Communication systems are often used to convene a call or meeting of a group of people. Often an organizer of a meeting must make repeated calls, each inviting a single called party, in order to organize a meeting. The recipient receives little or no indication of the reason for the call, or any urgency associated with it. If available, the calling line ID (CLID, or "Caller ID") or calling-name ID (CNID) may be displayed, and this may be recognized by the caller, but the context of the call is not available before answering or declining the call. The called party has limited flexibility in responding to the call: current systems allow the called party to accept (answer) the call; to ignore the call (silence the ringer); or to redirect the call "to treatment" (e.g. to a voicemail system, or perhaps to an assistant's line).

The calling party likewise receives little or no indication of the reason for the recipients "response". The calling party can distinguish acceptance (i.e, the called party answers) from rejection (e.g. voicemail, busy signal or simply no answer), but not the reason for rejection. Has the recipient looked at the call ID and chosen to ignore the call as they believe it is a lower priority to their current activity? Or are they truly not available (and/or not even aware of the call attempt?). This distinction can be important; for example, in high priority/emergency situations, knowing whether somebody can be reached via some interruption mechanism (e.g., calling their assistant) can be useful in deciding whether to continue attempts at reaching them, or whether an attempt to find an alternate is called for. In some cases being routed to someone's voicemail is worse than a busy signal, as the caller needs to wait for the voice mail system to answer, and is thus delayed from moving to the next viable candidate. Note that some "messaging" systems allow a user to define or direct a treatment for an incoming call. For example, if they are going to lunch, a user can elect to have their calls forwarded to their cell phone, or their voicemail. However, the calling party has no way of knowing this.

Moreover, the calling party has no mechanism available to explain the context of the call to influence or assist the called party in deciding how to respond.

In many situations, assembly of a group of skilled staff is required. As the participants often have varying schedules and different locales (especially for large campuses), assembling such a team can be problematic. In some circumstances, it is not necessary to assemble a group of specific individuals, provided a group with appropriate skills can be assembled. For example in healthcare and first-response situations, rapid assembly of a group of participants with skills appropriate to a class of emergency is critical. In such circumstances, quickly assembling an ad-hoc team with the right skills may be preferable to more slowly assembling a group of preferred (e.g., pre-designated) individuals.

Many institutions use paging systems (both the traditional loud-speaker type, as well as via a wireless pager), 'all-hands' radio broadcasts and the like to contact all staff and have them respond. However, such systems are inefficient and disruptive, especially to patients in a hospital who may be trying to sleep. Also, such approaches often either do not result in a complete team with the proper balance of skills, or result in redundant respondents. Moreover, except for situations where team composition is prearranged (and therefore inflexible), systems typically rely on manual lists and mechanisms (and sometimes even manual callouts), which adversely affects the timeliness of team formation.

Other media for assembling a call or meeting include instant messaging (IM), email, and paging systems. While IM generally demonstrates rapid delivery, paging and email systems can introduce delays. IM and email systems offer greater facility for delivering contextual information, but in general none of the three have good delivery-confirmation mechanisms. Email systems can offer read receipts, but these are not always reliable.

Moreover, existing IM, paging, and email systems all employ different addressing and access mechanisms, requiring the caller to select an alternative without information regarding the called party's currently preferred choice of communications mechanism. Furthermore, while using these systems can notify recipients of a call or meeting they are typically not capable of facilitating the a conference call itself, thus requiring two sets of communication devices (or at least applications).

It is, therefore, desirable to provide a communication system better suited for collaborations.

SUMMARY OF THE INVENTION

An aspect of the invention expands on the capabilities of existing communications services by introducing a stage in the session signaling process during which interactions with potentially multiple prospective parties are supported.

This additional suite of interactions can be introduced into existing IM, SIP signaling, SMS, traditional telephony, and other environments. It can also be introduced using separate paths which are associated with the signaling path.

These interactions provide contextual information about the session in order to allow a recipient to better decide whether or how to respond. An embodiment allows a recipient to respond with a yes, no or maybe response, and/or provides other information, before commencement of the session.

Such interactions are particularly useful in establishing a collaboration, especially if the collaboration is being established to respond to an event.

Another aspect of the invention provides a system which responds to a trigger event to determine the nature of any collaboration which should be assembled in response to the trigger, determine the requirements needed to respond to the event. These requirements set out the type of resources (personnel, equipment, information systems, etc) that are needed. The system then identifies a subset of specific resources based on a criteria, and invites the specified resources to collaborate to respond to the event. The criteria can include the availability of the specific resource. According to an embodiment, the system evaluates responses from the invited resources and then convenes the collaboration, for example by establishing one or more communication sessions. According to an embodiment, the system evaluates responses from the invited resources to ensure that the requirements are satisfied, and if not, determines other resources to invite.

An aspect, of the invention provides a method for allocating resources as part of collaboration comprising: receiving data relating to a triggering event; evaluating said data; responsive to said evaluating, identifying candidates for responding to said event; inviting candidates; evaluating responses by said candidates; and convening a collaboration of accepting candidates.

A further aspect, of the invention provides a method of establishing a collaboration comprising the steps of: a. Evaluating a triggering event; b. Responsive to said evaluation, defining collaboration requirements; c. Identifying resources which satisfy said requirements; d. Evaluating the availability of said resources; e. Determine if the minimum requirements are satisfied; f. And if the minimum requirements are not met, repeating steps c-f for some number of iterations.

A further aspect, of the invention provides a computer-readable storage medium comprising a program element for execution by a computing device to establish a collaboration, the program element including: computer-readable program code for evaluating an event; computer-readable program code for defining collaboration requirements to respond to said event; computer-readable program code for identifying resources which collectively satisfy said requirements, said resources including personnel candidates; computer-readable program code for evaluating the availability of said candidates; computer-readable program code for sending an invitation to available candidates, said invitation including contextual information about said event; and computer-readable program code for evaluating responses from the invited candidates.

A further aspect, of the invention provides a system for establishing a collaboration to respond to an event comprising: a. means for evaluating data regarding a triggering event; b. means for defining collaboration requirements responsive to said evaluation means; c. means for identifying resources which satisfy said requirements; d. means for prioritizing the identified resources to determine a subset of said resources which collectively satisfy said requirements; and e. inviting said subset to collaborate to respond to said event.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for enhancing collaborations.

We will describe exemplary embodiments. We will discuss examples with respect to a hospital setting, for which embodiments of the invention are well suited, but it should be appreciated that the invention has broader applicability.

Figure 1:
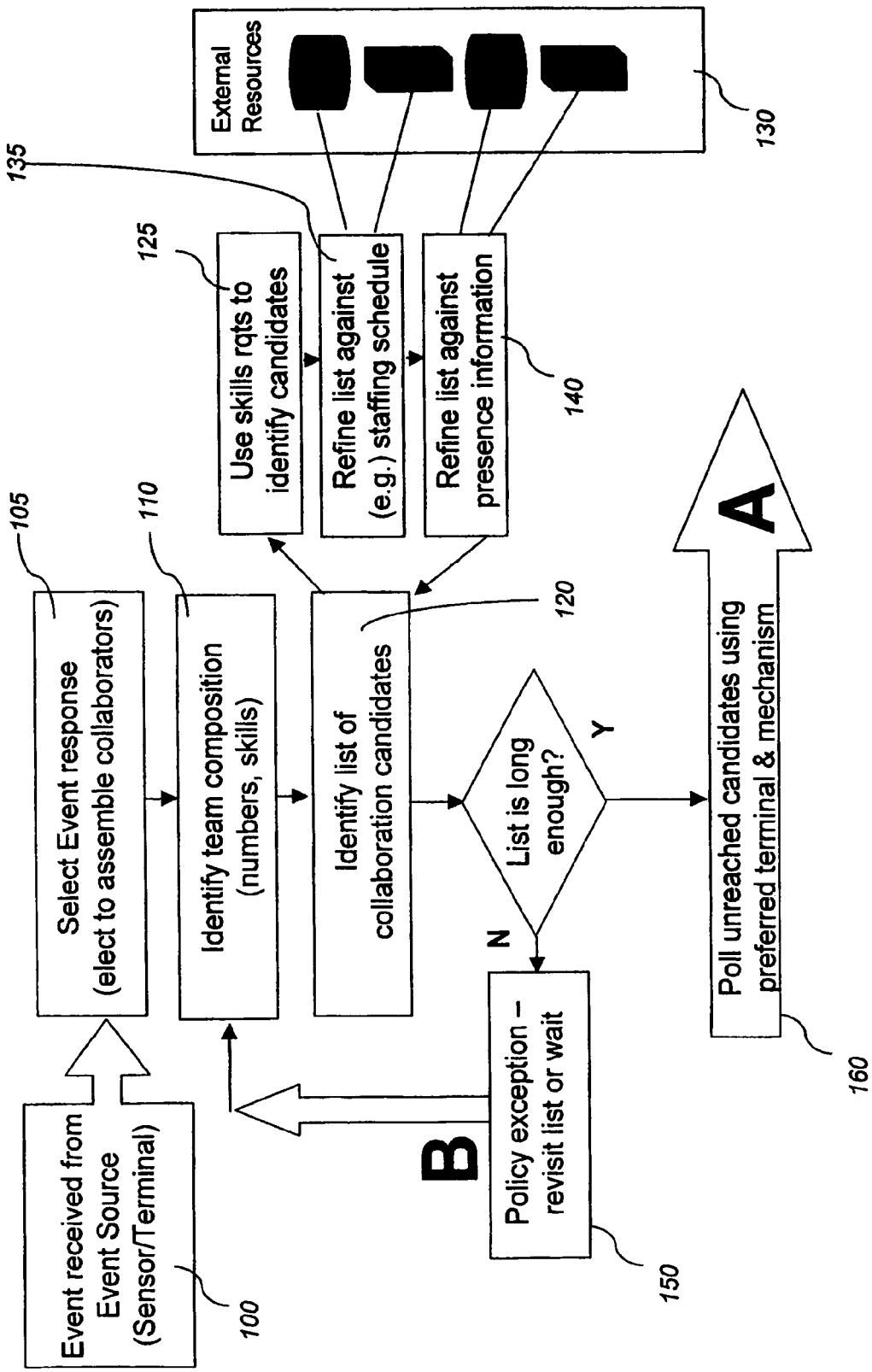
FIGS. 1 and 2 show a flowchart of a process for establishing a collaboration, according to one embodiment of the invention.

We will describe a system for establishing a collaboration, with reference to the embodiment illustrated in FIG. 1. Here the system assesses the collaboration requirements for an event, situation, or circumstances (hereafter referred to as event) that warrants the establishment of a collaboration. A conventional collaboration includes a call between or a meeting of personnel. In this specification collaboration means the application of resources needed to respond to an event or to solve a problem, or otherwise participate in an interaction. Here resources can include personnel and non-personnel resources. Typically the interaction involves a communication session, which can comprise any combination of a multimedia session, a conventional voice call, or a meeting Non-personnel resources can include equipment, systems, and locations and in some circumstances even animals (e.g. a canine unit for trained to detect drugs or explosives). It should be noted that each resource can use a different communication method to participate in the collaboration. For example, some people may meet in person, some may participate via a multimedia call, and others may participate by a conventional voice call. The multimedia call may take the form of an IP multimedia subsystem (IMS) call, for example as described in IMS—IP Multimedia Subsystem—The value of using the IMS architecture, a white paper from Ericcson, dated October 2004 and downloaded from: http://www.ericsson.com/products/white_papers_pdf/ims_ip_multimedia_subsystem.pdf, the contents of which are hereby incorporated by reference.

For ease of illustration, we will describe this embodiment with reference to the example of an emergency scenario in a health care establishment, wherein there is often a need to quickly assemble a team of practitioners or clinicians to deal with a medical emergency. For ease of reading, the healthcare establishment will hereinafter be referred to as a hospital, but it should be understood that the healthcare establishment may be of any size and may consist of a single building or a campus including one or more buildings or pavilions and possibly one or more adjacent areas such as roads and parking lots.

The resources which are needed will depend on the nature of the emergency. For example, a hospital may have pre-defined color coded alarms, indicating the type (or priority) of the emergency, and indicate the type of resources (which in this case refers in part to the skill set of the personnel) which may be needed (for example a lifesaving team in the case of a "code blue" or a security team in the case of a "code white" safety alarm).

Referring to FIG. 1 the first step illustrates receiving event information from an event source 100. The event source is the input to the system that triggers a need for a collaboration activity. This can be implicit (a call to a conference-bridge number or special extension); or it can be an explicit event, e.g. a sensor event (e.g. a heart-monitor alarm), or a "Code Alarm" issued from a terminal or nurse's station. The system then determines how to respond to the event. To do so, the system selects an Event response 105, which in this example will typically elect to assemble a team of collaborators to handle the emergency.

The next step involves identifying the collaboration composition based on the nature of the event 110. At this stage, the system determines the skills and/or other requirements necessary for dealing with the event. Note that, along with personnel, non-personnel requirements may be identified as needed and/or helpful to assist the personnel in the collaboration. These requirements can include information (e.g, medical records, including a description of recent surgeries), information systems (e.g., a radiology information system), equipment, or other resources (e.g., an operating room). The requirements can be determined by automated components (for example expert systems, policy servers, database resources, etc)

Next, the system identifies a list of resources which satisfy the requirements. FIG. 1 illustrates this process for generating a list of individuals who satisfy the team collaboration requirements. Assembling the candidates list will typically employ the details of the above collaboration composition identification. This information may be compiled statically or through reference to hospital IT resources. For example, the system would use the skills requirements identified in step 110 to identify a list of candidates who have the requisite skills 120. To do this, a list of individuals who posses the required skills is generated 125, either by means of a look-up table, or by reference to static or dynamic resources 130, for example databases and/or IT applications. In this example external resources accessed can include use of role-based HR databases and online staffing schedules to determine the list of practitioners whose skill set and scheduled availability apply to this situation. Note that, as stated earlier, the collaboration need not be limited to personnel, but may also include other resources, including patient records and access to radiology systems.

The assembled list is further refined through use of presence information 140 which reflects dynamic availability of potential resources, if available. For example, external databases and/or systems can provide location information (extractable for example using WiFi, GPS, or manual means) to resolve utility and priority of this candidate relative to the others on the list. Thus the closest individual with the requisite skill set and scheduled availability can be selected. However, the presence information can be used for more than selecting the closest individual. For example, even if a doctor with the appropriate specialty is available according to the day's posted schedule, the doctor's current location in an operating room typically implies the doctor is not available. One example of such a location system is described in U.S. patent application Ser. No. 11/064,930, filed Feb. 25, 2005, titled "Use of Location Awareness To Establish Communications with a Target Clinician in a Healthcare Environment", which is hereby incorporated by reference.

After the list of collaboration candidates is generated 120, the system checks to see if the list is long enough. For example, there may not be anyone with the appropriate skill set who is scheduled to be available. In this case a policy exception check 150 is made to either revisit the list generation procedure with more relaxed criteria or wait. For example, for a time sensitive emergency, waiting for everyone with the appropriate skill set is not an option. Thus, even if, for example, a specialist is not available, a team must be dispatched in a code blue situation, or a patient is likely to suffer serious trauma or even death. Thus a resident in the specialty or even a non specialist surgeon may be selected.

Figure 2:
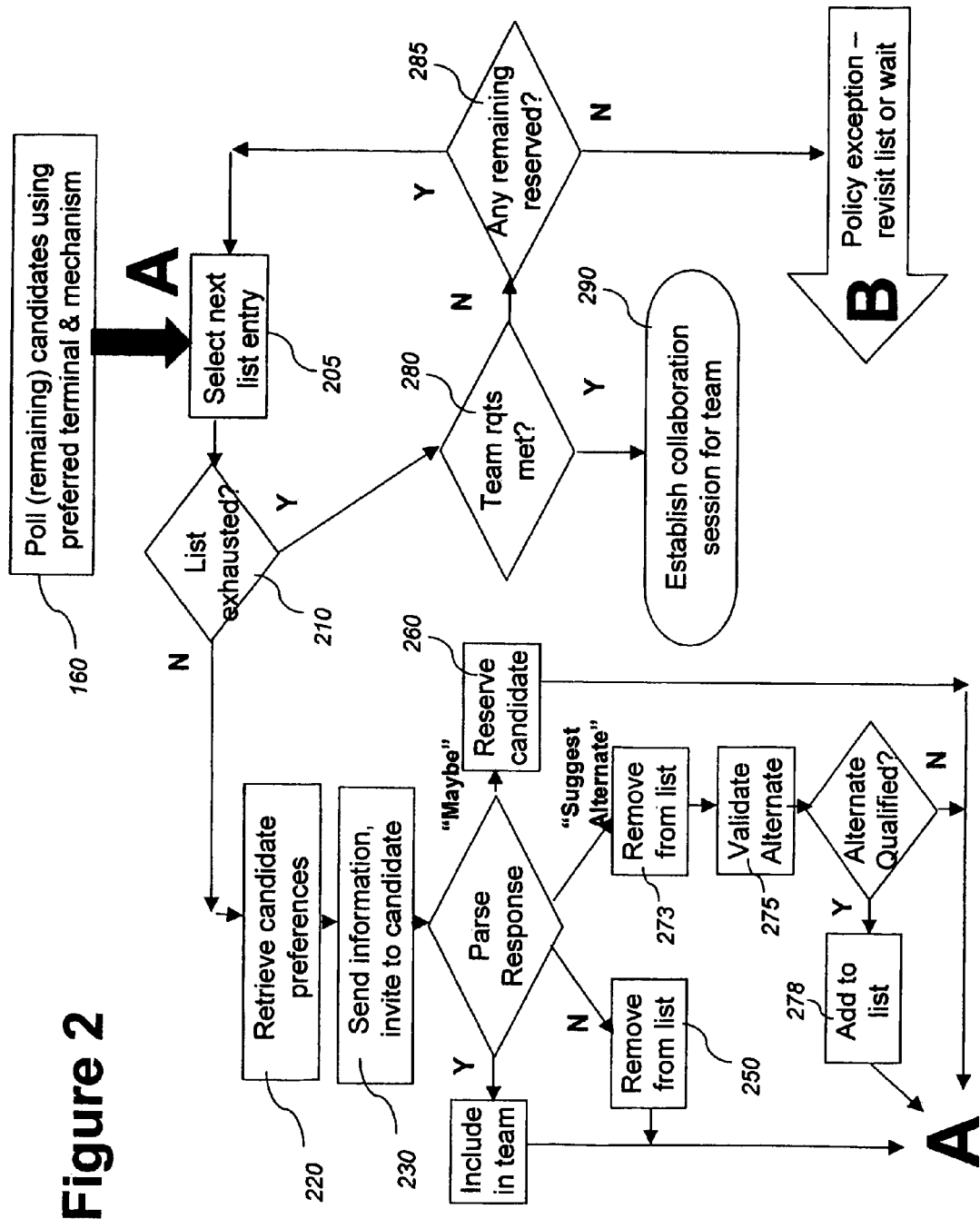

Assuming a sufficient list is generated, the next step is to invite the appropriate collaborators, through a polling mechanism 160, which is illustrated, according to an embodiment of the invention, in FIG. 2.

In the process described in FIG. 2, the system determines the next candidate for the collaboration from the list 205. Assuming the list is not exhausted 210, the system retrieves candidate preferences 220 (which may include presence information) to determine their (currently) preferred device and method for communication. This can potentially also determine the communications quality and/or medium as well as the device—for example, full-rate video using a 3G cellular telephone; or low-rate voice codec over WiFi PDA phone. Selection of device can also take into account dynamic conditions (e.g. current low signal strength over WiFi); static policies (e.g. communications must be secured); or collaborative requirements (e.g. image-display capabilities of at least VGA resolution are required).

The next step is to send an invitation to the candidate, which may contain information relating to the context of the invitation 230. Both the nature of the invitation and the information depends on the situation, and the device (and/or) medium used to receive the invitation. For example, at this point and for each candidate, call context as identified by the caller or situation, and/or as supplied by the system can be transcoded, summarized, regenerated, mixed or combined, then forwarded to their preferred device and presented as part of the signaling information for this call. Said information can be static or dynamic in nature. The context information as identified by the caller or situation will typically include a text description of the nature of the call/meeting. However, with more advanced devices, this information can include information from other resources; for example an image file, video stream, patient vital signs as returned by monitoring equipment, or traffic conditions as streamed from a surveillance camera. Context information supplied by the system can include calling-number ID, name, role or corporate information.

For each candidate, the system collects and evaluates a response to the call invitation. The response can take various forms, including call acceptance ("yes"); call refusal ("no"); call deferral ("maybe"); or other information. Call acceptance can be implicit (e.g. the handset is lifted from its cradle) or explicit (e.g. a key or softkey is pressed, or acceptance spoken, to acknowledge acceptance). In this case, the system adds the candidate to the team under formation 240. Similarly, call refusal can be implicit (e.g. the called party turns the terminal off, or loses connectivity) or explicit (e.g. through use of a key, softkey, or spoken refusal). In this case, the system removes the candidate from the list 250. Call deferral, for example can take the form of message indicating the recipient is not currently available at the moment, but will be available shortly (or specify a time). Alternately, call deferral can take the form of a "maybe" response, which indicates that the called party could participate if necessary but would prefer the calling party check with others first; this implies a willingness to be asked again. In this case the system reserves the candidate 260, which implies this candidate is flagged to be invited again if needed.

The called party can also provide additional responses, either alone or in conjunction with any of the above; an example without restriction is that of recommending another contact; when returned as part of a "no" or "maybe" response this can be inferred to be an "alternate" contact; when accompanying an "acceptance" this can be inferred to suggest an "additional" contact. In the example illustrated in FIG. 2 the candidate has responded with a "no, but try alternate candidate x". The candidate is then removed from the list 273. An optional step is to validate recommended alternates 275 for appropriateness in light of corporate, regulatory or other policy, and removing those which are not acceptable by those terms. The system can also validate alternates by carrying out steps 125-140. If the alternate is qualified, then the alternate is added to the list 278. The process then repeats for the next entry in the list, as shown by A.

The nature and form of responses is dependent on the capabilities of the called party's terminal device.

The system must then review the responses from the candidates (it may do so dynamically as responses are received, or once through the "list" of candidates) and add the list of "yes" responses to the team under formation. The system must then (or continually) assess whether a quorum, in the context of this collaboration, has been achieved 280. If not, and/or if additional candidates are welcome in the context of the session, then recommended contacts and "maybes" can be revisited, for example, by determining if there are any remaining reserved candidates 285.

For each reserved candidate (e.g., those who responded "maybe", and for the approved suggested alternatives and additional new contacts) another invitation is sent by repeating the above described process (e.g., returning to step A). "Maybe" contacts can be removed either when they respond "yes" or "no", or after a number of invitations, where that number can be specified, defaulted, or policy-driven.

In circumstances where quorum cannot be reached using the candidates list as originally specified and augmented by calling-party-recommended contacts, the system executes a policy exception step B. Accordingly the system may elect to expand the list based on referral to policy or by petitioning the call originator—either of which may elect to defer (i.e. wait for others to come available); to relax requirements (expanding the candidates' list); to proceed understaffed, or to terminate the collaboration attempt.

Assuming the collaboration requirements are met 290, the collaboration is established (convened). This can be implicit in the case where the invitation was "please proceed with haste to location x". In other cases, the system can then explicitly establish the collaboration. For example, a collaboration call in the form of a multiparty conferencing session or multicast session can be dynamically established between members of the team. The system can, based on the preferences of the call originator and/or system policy, send all, part, or none of the team membership list to all, some, or none of the team.

Moreover, the system can also send information to subgroups or individuals within the team as appropriate to the requirements of those members, and the capabilities of their devices. For example, navigation information for reaching a chosen assembly point, and/or parking information for those arriving from remote locations can be sent to those members who need it (and can display the information)—without burdening team members for which this would be superfluous information.

Figure 3:
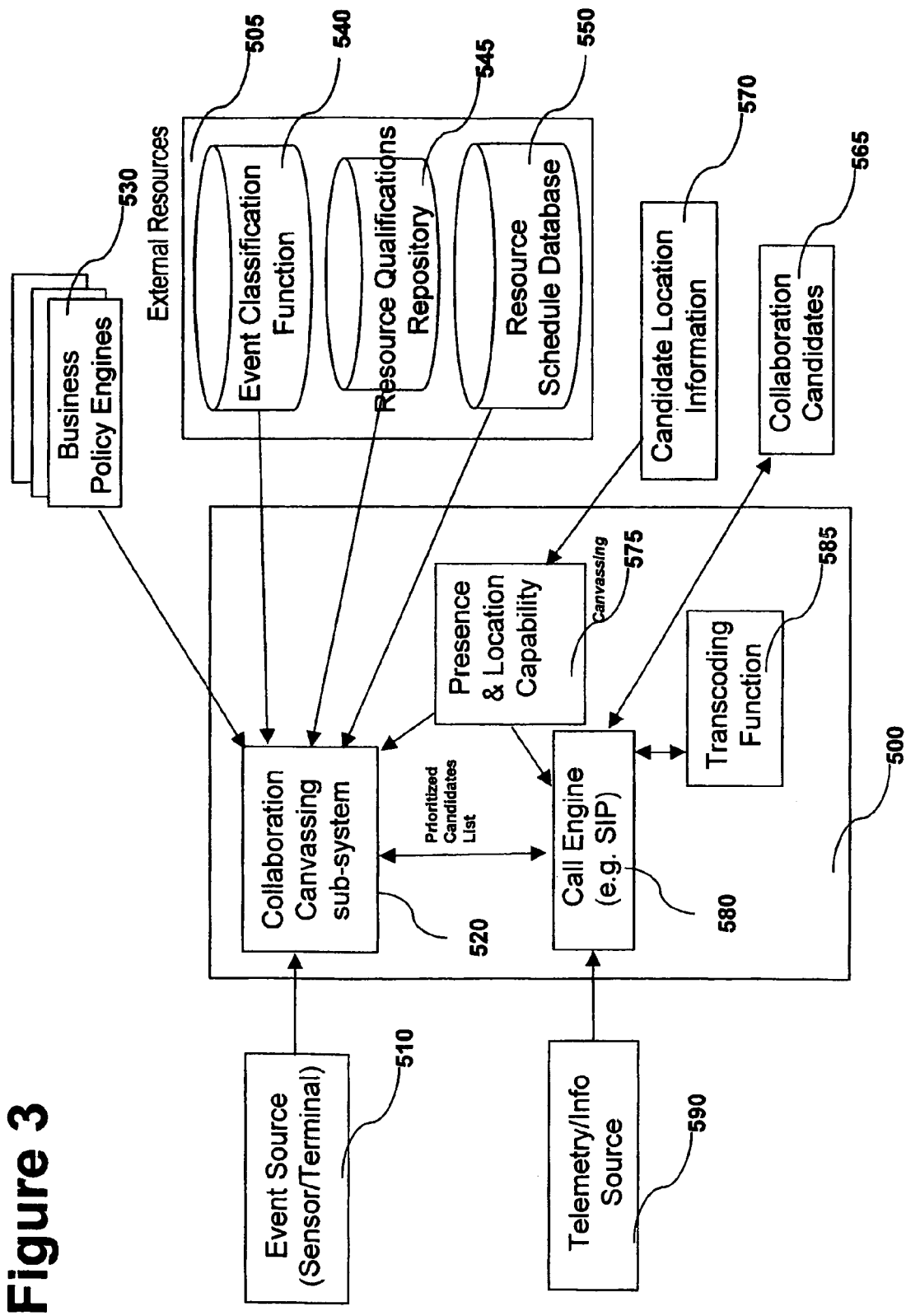
FIG. 3 is a block diagram illustrating some of the components of a system for establishing collaborations, according to an embodiment of the invention.

FIG. 3 is a block diagram illustrating some of the components of a system for establishing collaborations, according to an embodiment of the invention. The event source 510 is the input interface to the system that triggers a need for a collaboration activity. The event source is typically a sensor or terminal which initiates a session with the Collaboration Server 500. This could be implicit (e.g., a call to a conference-bridge number or special extension); or it could be an explicit event, e.g. a sensor event (e.g. a heart-monitor alarm) or a "Code Alarm" issued from a terminal or nurse's station.

As shown, the Collaboration Server 500 includes a collaboration canvassing sub-system 520, a Presence & Location Capability sub-system 575, a call engine 580, and a transcoding function 580. In this figure, external resources utilized by the collaboration server include an Event Classification sub-system 540, a Resource Qualifications Repository (RQR) 545, a Resource Schedule Database (RSD) 550, Business Policy engines 530 and a candidate location sub-system 570. It should be noted that the division of sub-systems between those internal to the Collaboration Server 500, and those accessed as external resources, can vary substantially.

The Resource Qualifications Repository 545 is a repository of resources available for the collaboration. It can comprise multiple repositories, and can include both animate and inanimate resources. It can be queried to return a list of candidate resources based on the aggregate or piecewise composition of the team identified by the event classification function 540.

The resource schedule database 550 provides information regarding current scheduled availability of resources. Once again this can comprise multiple databases and/or sub-systems, especially if the collaboration requires different types of requirements, or requirements from different entities. One example would be an HR database for personnel to determine who is currently scheduled as on-duty. However resources may be required (and may be tracked using a separate scheduling databases). As but one example in a hospital setting, an Operation Room may be included as a resource, and there the hospital may have a separate sub-system for scheduling ORs. MRI or other laboratory functions are other examples of resources, the availability of which may need to be ascertained via an external sub-system.

As stated, the RQR 545 and the RSD 550 are illustrated as external resources as they may include systems which have applicability outside of the collaboration function (e.g. the HR database). However, it should be appreciated that the external resources can be hosted by the collaboration server 500.

The collaboration canvassing sub-system 520 is responsible for coordinating activities between the different components. It receives relating to a triggering event (from some external source). The collaboration canvassing sub-system 520 references an Event Classification sub-system 540 to evaluate the nature of the response needed for the triggering event. The Event Classification sub-system 540 determines if a collaboration is indicated, and indicates the requirements for the collaboration. The collaboration canvassing sub-system 520 then determines what resources are available to satisfy the requirements. This can be achieved by accessing a list of available resources from the Resource Qualifications Repository (RQR) 545 which may be correlated against current scheduling information from a Resource Schedule Database (RSD) 550, with possible reference to external Business Policy engines 530, to produce a list of resources. This list of resources can include a prioritized or ordered list of collaboration candidates 565. Collaboration candidates are personnel whose profile indicates they have the skills set out in the requirements, and who are scheduled to be available. This list is optionally further refined by the Presence & Location Capability sub-system 575 based on candidate location information 570 for each candidate. Note that this is one example, as many changes can be made. For example, the RQP 545 and the RSD 550 are shown as separate external entities. However they need not be external, and they can be combined. Alternatively, there may be a plurality of sub-systems that need to be accessed to provide all of the information, some of which may be internal (i.e. maintained by the collaboration system for its purpose), and some may be external (i.e., are part of separate systems, which may be maintained for other reasons, but are accessed by the collaboration system).

The collaboration canvassing sub-system 520 responds to an event trigger by executing an event classification function 540 to determine the nature of a response required for the triggering event. The event classification function can be integrated or it can be accessed as an external resource. It can comprise a database query, or it can involve an expert system evaluating the situation, or it can access a technician if human judgment is required. In addition, the event classification function 540 can optionally consult business-policy engines as part of its evaluation process. The response can range from null (i.e. disregard (with possible logging)) to convening a collaboration or collaborations. The collaboration comprises collaboration resources which can include personnel (candidates) resources and other (non-personnel) resources (for example information systems, equipment and/or in some cases animals, e.g. a sniffing dog for a security related application). The collaboration canvassing server 520 will typically provide a prioritized list of candidates to a call engine 580, which actually controls communications with the candidates. Alternatively, the collaboration canvassing server 520 will produce and update internally the prioritized list of candidates, and will use the Call engine to communicate with each candidate in the list.

The collaboration canvassing sub-system 520 uses the Call Engine 580 to canvass each of the possible candidates and it updates the candidates list based on responses from each of the candidates. Once the (minimum) requirements for the team are satisfied, the collaboration canvassing server 520 may perform addition steps to convene the meeting as needed: for example, it can allocate the appropriate resources and it can instruct the call engine 580 to establish a collaboration environment for the team if needed. However, in some scenarios, the collaboration server may not need to establish a communication session, for example, if the nature of the collaboration was simply to ensure sufficient resources are directed to a location to satisfy the requirements.

The call engine 580 is responsible for communication with each candidate, preferably using a mechanism identified in their presence preferences. In the preferred embodiments described, this communication can take place in stages, in order to allow interactions with potential candidates before collaboration convenes (or each candidate joins). Note that not all candidates may be able to utilize devices which allow for such a rich set of interactions prior to call set up. The first communication, invites the candidates to the collaboration, preferably offering contextual information as part of the invitation. This contextual information can take different forms, depending on the devices used, and the nature of the invitation. The contextual information is intended to provide the recipient candidate with information about the nature of the collaboration so they can determine whether they should accept.

This may include static information, and may include information from an external telemetry/information source 590, which is possibly the same as the original event source 510. For example a patient vital signs monitor can trigger an alarm, and then continue to send vital signs (i.e. the telemetry data).

As each candidate may be using different devices, or may use a different device at different times, the call engine needs to be able to communicate with a plurality of devices, possibly using a plurality of protocols. Accordingly, some or all this information may require transcoding appropriate for delivery using the mechanism selected by that candidate. The transcoding function converts the telemetry/information source and any other contextual information to be sent to each candidate to a format and protocol appropriate for that candidate's terminal device. This transcoding function 585 can be integrated within the call server, or may be separate. Furthermore, it should be recognized that more than one transcoding function sub-system may be used.

The call engine will also collect the response(s) from each candidate and return those to the canvassing server (either aggregate or piecewise) for processing. Later, depending on the nature of the collaboration, it convenes and hosts (where necessary) one or more collaboration functions for the team, or for a subset of the team. For example, some team members will assemble at a specified location, while other will participate via video conference. In this case the hosted collaboration function is the video conference.

The Presence & Location Capability sub-system 575 provides contact preferences for each candidate, and may further include information such as their current location as established possibly through reference to external sensors or repositories (the Candidate Location Information 570). Thus this sub-system is utilized by the collaboration canvassing server 520 to refine the prioritized list of candidates, and by the call engine 580 to determine the best method of communication with them.

Some embodiments can include a Telemetry/info Source which provides information useful to provide context to collaboration candidates to help in deciding whether they should elect to participate in the collaboration. Such an information source may also act as a collaboration resource and continue to be used by the assembled team.

Many variations can be made to the above, as various components can be combined, or subdivided, or omitted altogether. As a non-limiting example, the presence and location system can comprise two subsystems, which may or may not be integrated.

We will once again describe a medical emergency example, in which a patient, who recently had surgery to remove a cancer tumor from the back of their throat, suffers an arterial bleed at the site of the removed tumor. This represents a life/or death emergency as the patient will die, either from blood loss, or drowning from blood filling their lungs, unless the bleeding is stopped. We will discuss how an embodiment of the invention can be used to establish a collaboration of resources to respond to this emergency. As a first response a nurse monitoring the patient pushes an emergency alarm above the patient's bed. This triggers a two way voice communication system, between the patient's room and a nurse station in the ward. The nurse in the room, recognizing the threat of imminent death, screams the patient is bleeding profusely and to sound a code blue alarm. Code blue is often the code for cardiac arrest, but in this case is being used as the highest level of alarm, requiring immediate life saving intervention.

While the nurse in the room inserts a suction mechanism in the patient's mouth to prevent the blood from draining into the patient's lungs, the nurse in the ward activates an embodiment of the invention. The nurse enters code blue, arterial bleed, patient x at her computer, which sends this event information to the collaboration canvassing server. The event classification function 540 receives this information, and determines that emergency surgery is required. This can involve an expert system evaluating the situation, or a triage technician. Either way two collaborations are established in parallel. First an emergency response team is sent to the patient's room to stabilize the patient, and then to transfer the patient to a designated operating room (OR).

Second a surgical team is assembled in the OR. The patient's medical records are accessed to determine the nature of the prior surgery (head neck oncology) and indicates the name of the head-neck oncologist (HNx) who performed the initial cancer surgery, and the name of the radiologist (RADx) who reviewed the MRI results indicating the location of the tumor. From this the Resource Qualifications Repository 545 is accessed to identify what resources and personnel are required for the collaboration. An anesthesiologist, surgical nurse, a radiologist (preferably RADx), and head-neck oncologist (preferably HNx) are the identified skills. In addition, the following resources are required: an OR (preferably one with access to the radiology system), and the patients MRI results.

First the system accesses a hospital Resource Schedule Database 550, to determine what ORs are available. The system selects one with the closest location to the patient, and then displays the patients MRI images in the selected OR. An anesthesiologist and surgical nurse are listed, after accessing the scheduling system to determine who is available near the selected OR.

The Resource Schedule Database 550 indicates that RADx is on holiday, so another Radiologist is identified.

The Resource Schedule Database 550 indicates HNx is not in the hospital at the moment, but is rather at his private clinic, several miles from the hospital. Thus another surgeon head-neck oncologist is needed. HNy is scheduled to be available, and is added to the list. However the Collaboration and Canvassing Server rejects HNy as the Presence & location Capability sub-system 575 checks the candidate location information 570, which indicates HNy is currently in another OR and is thus unavailable. Another head-neck oncologist HNz is on-call, and is therefore added to the list.

The system then turns to inviting HNz. The Presence & Location Capability subsystem 575 retrieves HNz's preferred device information, and determines that an invitation should be sent to their cell phone. As part of the call-set up, the system sends an event context as part of the signaling exchange; which is displayed (e.g., emergency surgery needed) while the cell phone rings (with its high priority ring tone, if available on HNz's device). HNz answers, but because he is 30 minutes away from the hospital, he suggests that an Ear-Nose & Throat surgeon (ENTx) in the hospital should be called. This alternate candidate is validated, and is called. She indicates she is available, and while proceeding to the OR, indicates that HNx should be called to provide guidance while she operates. (alternatively, ENTx may not appear qualified, but as no such specialist is available to meet the collaboration requirements, a policy exception decision is made, which determines an ENT surgeon can participate if provided guidance by HNx). Another resource, namely an OR camera feed to the consulting HN oncologist, is identified.

HNx is called at his clinic. Meanwhile the live OR feed is streamed to his computer.

Meanwhile the selected anesthesiologist, surgical nurse, and radiologist are all invited, using their preferred devices. The selected anesthesiologist and surgical nurse both indicate acceptance, and, as is required in the circumstances of this example, they proceed to the OR, as their physical presence is required. The Radiologist declines implicitly by pressing an ignore softkey on his phone.

No other radiologist is identified as available, so the Policy exception process is implemented. Two possibilities are listed. Calling the radiologist's secretary to see if he can be made available, or to proceed without a Radiologist. A decision is made that a radiologist is not crucial, and is therefore removed from the list. This decision can be made by the expert system, triage operator, or other. For example, HNz can be notified that no radiologist is available, and he can indicate he is prepared to review the MRI results. They are then sent to his computer.

Meanwhile the call engine 580 establishes a video conference with HNz, providing him with a camera feed and two way voice communication, so that he can advise ENTx who will actually carry out the surgery. Meanwhile, the medical records and MRI results are displayed by the OR's computer screens, while the first response team stabilizes the patient, and transports the patient to the selected OR.

While embodiments of the invention have been described with respect to a hospital emergency, it should be noted that the invention has broader application than just for an in hospital system. For example, an embodiment of the invention can be used for a "community" emergency, for example in response to a 911 call, wherein various resources, including any or all of police, fire, ambulance etc may need to be quickly assembled. In some situations, the proximity of a first responder may be more important than the particular skill set, especially for on the spot evaluations of an emergency situation. A thermal or smoke sensor can act as a trigger event in the case of a fire. A security camera video feed can act as a non-personnel resource in this sort of case.

While the embodiments described herein have been explained with respect to emergency situations, the invention has applicability to more mundane collaborations, for organizing a plurality of resources.

Embodiments of the invention can be implemented as software running on an appropriate platform which has computing resources (e.g. a processor), memory and network connectivity, for example a server. It can be incorporated with, or communicate with an appropriate communication switch, which, for example may be a PBX or public-system telephony switch, or a softswitch. Connectivity to legacy computing equipment, or to wireless or other transport equipment may require dedicated hardware. Integration with specific telemetry equipment or support for specific terminal devices may likewise involve hardware with specific characteristics beyond computing resources and network connectivity.

Those skilled in the art will appreciate that in some embodiments, certain functionality may be implemented as pre-programmed hardware or firmware elements (e.g., application specific integrated circuits (ASICs), electrically erasable programmable read-only memories (EEPROMs), etc.), or other related components. In other embodiments, the system or sub-systems may comprise an arithmetic and logic unit (ALU) having access to a code memory (not shown) which stores program instructions for the operation of the ALU in order to implement the functional entities and execute the various processes and functions described above. The program instructions could be stored on a medium which is fixed, tangible and readable directly (e.g., removable diskette, CD-ROM, ROM, or fixed disk), or the program instructions could be stored remotely but transmittable to the server via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

The above-described embodiments of the present invention are intended to be examples only. Alterations, modifications and variations may be effected to the particular embodi-

What is claimed is:

1. A method for establishing a collaboration, said method comprising:
receiving, by a processing entity, event information identifying an occurrence of an event having an event type;
determining, by the processing entity, a collaboration qualification set that identifies qualifications of desired participants for the collaboration based on the event type by accessing a resource qualifications repository, the resource qualifications repository identifying a different respective collaboration qualification set for each of a plurality of different event types, each different respective collaboration qualification set identifying a desired qualification for each of a plurality of participants for a respective event type;
identifying, by the processing entity, from a plurality of individuals, a group of participants each of whom is identified as having at least one of the desired qualifications identified in the collaboration qualification set;
determining, by the processing entity, that at least one participant of the group of participants that has a particular Qualification of the desired Qualifications is unavailable for the collaboration;
in response to determining that the at least one participant is unavailable for the collaboration, identifying another participant from the plurality of individuals that has the particular qualification; and
determining that the another participant is available for the collaboration.

2. A method as defined in claim 1, wherein the collaboration Qualification set further identifies the desired qualification for a non-personnel resource.

3. A method as defined in claim 1, further comprising:
convening the collaboration of the group of participants.

4. A method as defined in claim 3, wherein identifying the another participant from the plurality of individuals that has the particular qualification comprises:
receiving, from the at least one participant, information identifying the another participant.

5. A method as defined in claim 1, wherein the collaboration comprises a communication session.

6. A method as defined in claim 1, wherein determining, by the processing entity, that the at least one participant of the group of participants that has the particular qualification of the desired qualifications is unavailable for the collaboration comprises:
obtaining location information and presence information associated with the at least one participant; and
based on one of the location information and the presence information, determining that the at least one participant is unavailable.

7. The method of claim 1, wherein the event information is received from a monitoring device via a network.

8. A system, comprising:
an input for receiving event information identifying an occurrence of an event, the event having an event type; and
a processing entity operative for:
determining a collaboration qualification set that identifies qualifications of desired participants for a collaboration based on the event type by accessing a resource qualifications repository, the resource qualifications repository identifying a different respective collaboration qualification set for each of a plurality of different event types, each different respective collaboration qualification set identifying a desired qualification for each of a plurality of participants for a respective event type;
identifying from a plurality of individuals, a group of participants each of whom is identified as having at least one of the desired qualifications identified in the collaboration qualification set;
determining that at least one participant of the group of participants that has a particular qualification of the desired qualifications is unavailable for the collaboration;
in response to determining that the at least one participant is unavailable for the collaboration, identifying another participant from the plurality of individuals that has the particular qualification; and
determining that the another participant is available for the collaboration.

9. A non-transitory computer readable storage medium comprising a program element for execution by a processing entity, said program element comprising:
program code for receiving event information identifying an occurrence of an event having an event type;
program code for determining collaboration qualification set that identifies qualifications of desired participants for a collaboration based on the event type by accessing a resource qualifications repository, the resource qualifications repository identifying a different respective collaboration qualification set for each of a plurality of different event types, each different respective collaboration qualification set identifying a desired qualification for each of a plurality of participants for a respective event type;
program code for identifying from a plurality of individuals, a group of participants each of whom is identified as having at least one of the desired qualifications identified in the collaboration qualification set;
program code for determining that at least one participant of the group of participants that has a particular qualification of the desired qualifications is unavailable for the collaboration;
program code for in response to determining that the at least one participant is unavailable for the collaboration, identifying another participant from the plurality of individuals that has the particular qualification; and
program code for determining that the another participant is available for the collaboration.

* * * * *